Jan. 27, 1931.  M. I. GOLDSMITH  1,790,141
BEET CULTIVATOR
Filed Dec. 9, 1929
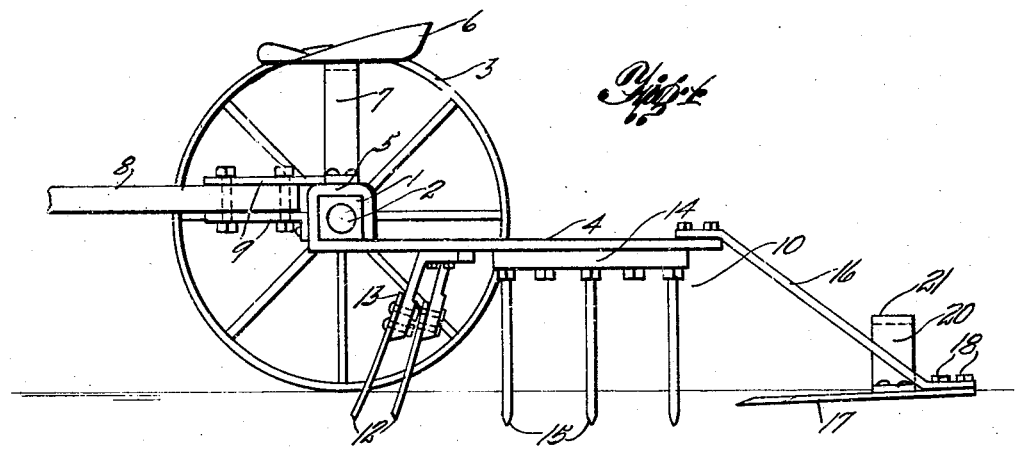
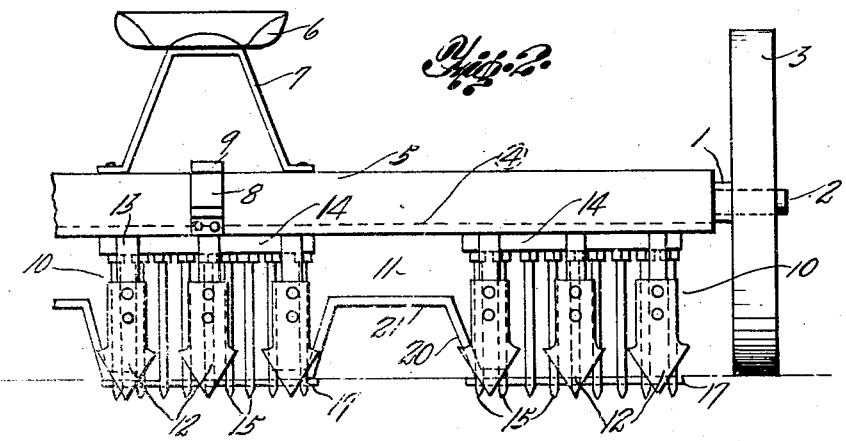
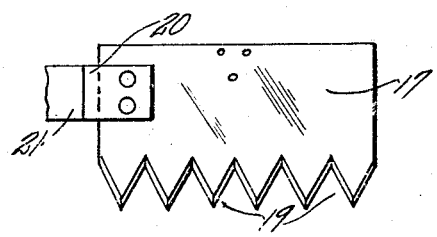
Inventor
Mary I. Goldsmith
By Adam E. Fisher
Attorney Patented Jan. 27, 1931

1,790,141

UNITED STATES PATENT OFFICE

MARY I. GOLDSMITH, OF GREELEY, COLORADO

BEET CULTIVATOR

Application filed December 9, 1929. Serial No. 412,642.

This invention is an implement for thinning young sugar beets or like plants which are sown in thick rows and then thinned out after they have emerged from the soil in order to allow greater space for the remaining plants.

The main object of the invention is to provide an implement of this kind comprising a plurality of laterally spaced sets of cultivator shovels, harrow teeth and serrated knives which will positively and efficiently remove all the undesired plants and at the same time thoroughly cultivate the soil between the remaining plants.

Another object is to provide an implement of the kind described in a simple, efficient and durable form.

The foregoing and other objects together with means whereby the same may be carried into effect will best be understood from the following description of a preferred embodiment of the invention taken in connection with the accompanying drawing wherein:

Figure 1 is a side view of the implement, the rear wheel being removed.

Figure 2 is a front view of a portion of the implement showing the center and side beet thinning elements.

Figure 3 is a detail plan view of one of the serrated knives.

In carrying out the invention I provide an elongated axle 1 preferably square in cross section intermediate its ends but having its ends rounded as at 2 for the reception of the supporting wheels 3 which are journaled thereon. A rectangular supporting frame 4 has its forward margin bent around the axle 1 as at 5 and extends rearwardly therefrom. A seat 6 is supported on a bracket 7 secured to the forward margin of the frame 4 and a conventional draft mechanism 8 is secured between brackets 9 mounted upon the frame 4 near its center as shown.

A plurality of sets or gangs of plant thinning elements as shown at 10 are provided and the same are laterally spaced from each other in order to provide passageways 11 through which the plants to remain standing may freely pass. Each of these sets or gangs 10 comprise three spaced cultivator shovels 12 secured to the conventional attaching feet 13 which are mounted beneath the frame 4 near its forward margin. Rearwardly of the cultivator shovels 12 harrow plates 14 are mounted and a plurality of harrow teeth 15 are conventionally connected to these plates, the said teeth preferably being arranged in three spaced rows with the forward row containing three laterally spaced teeth, the next row four and the rear or last row five. Obviously the harrow plates 14 may be dispensed with and the harrow teeth 15 mounted directly upon the frame 14 if so desired, the plates 14 serving only as a means for removing all the teeth from the frame as a unit when such action is necessary. Hangers or brackets 16 are extended rearwardly and angularly downward from the rear of the frame 4 behind each set or gang 10 of thinning elements and cutting knives 17 are secured at 18 thereto. These knives 17 extend forwardly and slightly downward from their point of attachment to the hangers 16 and have their forward margins serrated or toothed as at 19. Adjacent edges of the knives 17 are connected by cross pieces or bridges 20 which have their connecting laterally extending portions 21 disposed above the plane of the knives 17 so that the plants may pass thereunder.

In use the machine is drawn laterally across the rows of plants by any suitable draft means. The cultivator shovels 12 and harrow teeth 15 uproot the plants to be removed and cultivate the soil and the cutting knives 17 drag the plants from the soil or cut the same so that the undesired plants will be thoroughly removed. The remaining plants of course pass between the sets or gangs 10 of thinning elements and are not injured. Obviously any number of sets or gangs 10 may be employed with any spacing therebetween.

While I have herein set forth a certain preferred embodiment of my invention it is understood that I may vary from the same in minor structural details so as best to construct a practical device for the purposes intended, not departing from the spirit of the invention and within the scope of the appended claim.

I claim:

In a device of the kind described, a wheel borne frame, a plurality of laterally spaced gangs of cultivator shovels mounted on the frame, a plurality of laterally spaced harrow plates detachably mounted on the frame behind and in alignment with the said cultivator shovel gangs, a plurality of harrow teeth secured to the said harrow plates, brackets secured to the frame and extended rearwardly and downwardly therefrom, serrated cutting knives secured to the said brackets in laterally spaced relationship and in alignment with the said cultivator shovel gangs and harrow plates, and upwardly arched cross pieces connected between the said blades.

In testimony whereof I affix my signature.

MARY I. GOLDSMITH.